US006758186B2

(12) United States Patent
Janoske

(10) Patent No.: US 6,758,186 B2
(45) Date of Patent: Jul. 6, 2004

(54) CLEANING ARRANGEMENT FOR THE COMBUSTION AIR OF AN INTERNAL COMBUSTION ENGINE

(75) Inventor: Uwe Janoske, Michelfeld (DE)

(73) Assignee: Andreas Stihl AG & Co., Waiblingen (DE)

( * ) Notice: Subject to any disclaimer, the term of this patent is extended or adjusted under 35 U.S.C. 154(b) by 54 days.

(21) Appl. No.: 10/162,902

(22) Filed: Jun. 6, 2002

(65) Prior Publication Data

US 2002/0189573 A1 Dec. 19, 2002

(30) Foreign Application Priority Data

Jun. 13, 2001 (DE) .......................................... 101 28 787

(51) Int. Cl.[7] .................................................. F01P 1/02
(52) U.S. Cl. .................................. 123/198 E; 123/41.56
(58) Field of Search ........................ 123/198 E, 41.56, 123/41.7, 41.65

(56) References Cited

U.S. PATENT DOCUMENTS

| 3,853,518 A | | 12/1974 | Tu et al. | |
| 5,363,815 A | * | 11/1994 | Pretzsch et al. | 123/198 E |
| 5,542,380 A | * | 8/1996 | Chatten | 123/198 E |
| 5,720,243 A | * | 2/1998 | Stegmyr et al. | 123/198 E |
| 5,746,160 A | * | 5/1998 | Stark et al. | 123/198 E |
| 6,227,162 B1 | * | 5/2001 | Dahlberg et al. | 123/198 E |
| 6,295,953 B1 | * | 10/2001 | Ohsawa et al. | 123/198 E |
| 6,391,073 B1 | * | 5/2002 | Koga | 123/198 E |

FOREIGN PATENT DOCUMENTS

| DE | 29 04 250 | | 1/1981 | |
| DE | 44 35 430 | | 4/1995 | |
| FR | 2 572 305 | | 5/1986 | |
| GB | 146407 | * | 2/1977 | ........... B01D/45/16 |
| GB | 1 464 407 | | 2/1977 | |

* cited by examiner

Primary Examiner—Henry C. Yuen
Assistant Examiner—Jason Benton
(74) Attorney, Agent, or Firm—Walter Ottesen

(57) ABSTRACT

The cleaning arrangement (1) is provided for the combustion air (2) of an internal combustion engine (3) in a portable handheld work apparatus such as a cutoff machine. The cleaning arrangement is formed from a filter housing (4) which contains an air filter (5) in order to ensure a disturbance-free operation especially for a dust-laden ambient air of the work apparatus. The air filter (5) partitions the filter housing (4) into a contaminant space (7) and a clean space (8). The clean space side (8) is connected to a carburetor (9) of the engine (3). To minimize the dust deposit on the contaminant space side of the air filter (5), a centrifugal-force separator (11) is arranged in the filter housing (4) and is charged with combustion air (2) which is supplied under pressure by a cooling air fan (30) via a feed channel (24) to the separator (11). In the centrifugal-force separator (11), the combustion air (2), which is laden with dust (33), is divided into a tangential flow (14) having a higher particle density (15) and a core flow (12) having a low particle density (13). The core flow (12) is supplied to the contaminant chamber (7) of the filter housing (4).

14 Claims, 2 Drawing Sheets

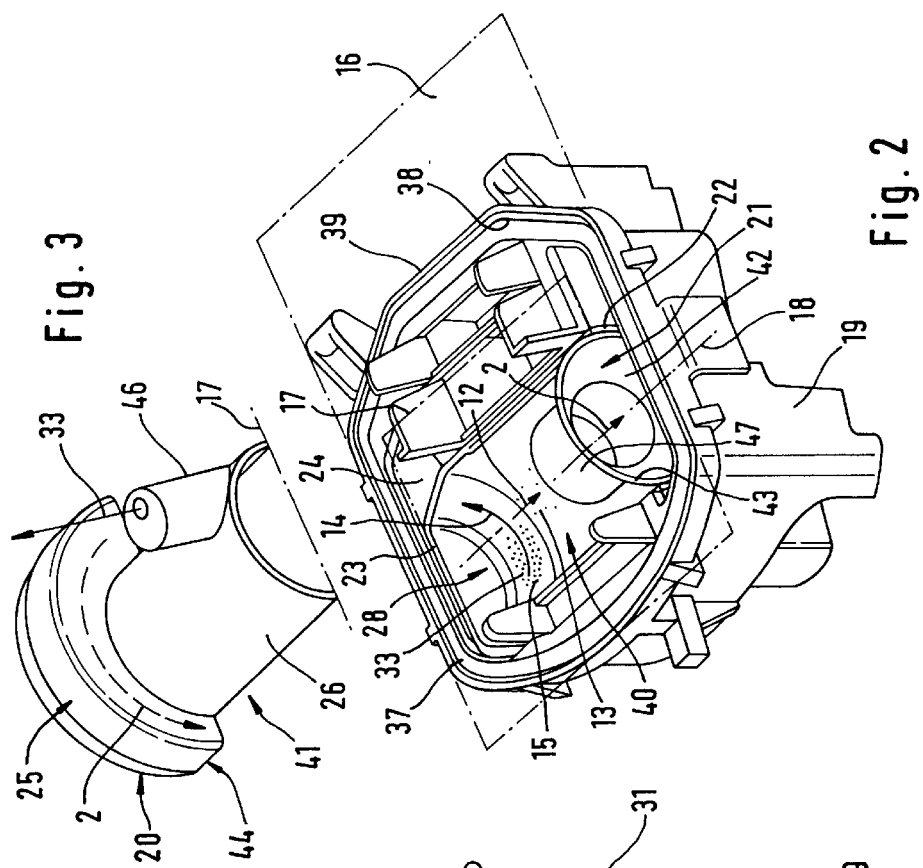
Fig. 3
Fig. 2
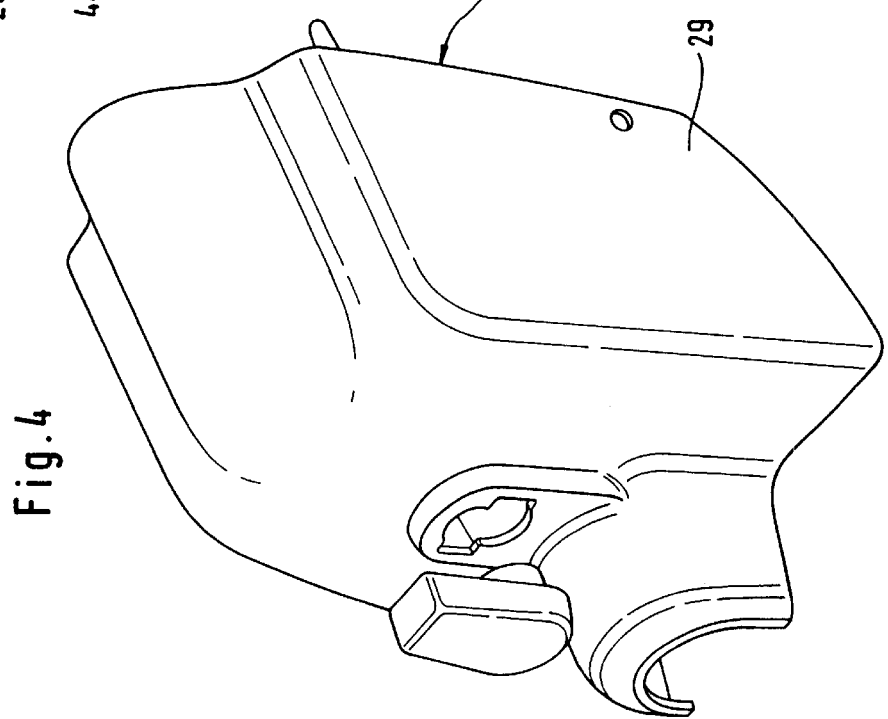
Fig. 4

CLEANING ARRANGEMENT FOR THE COMBUSTION AIR OF AN INTERNAL COMBUSTION ENGINE

BACKGROUND OF THE INVENTION

U.S. Pat. No. 5,526,777 discloses a cleaning arrangement for the combustion air of an internal combustion engine of a portable handheld work apparatus wherein a blower of the portable handheld work apparatus moves air to an air filter. The air filter is accommodated in a filter housing and partitions the filter housing into a contaminant space and a clean space. A carburetor of the engine is fluidly connected to the clean space of the filter housing. The air filter can be charged with dust to an extreme extent in dependence upon the dirt content of the ambient air of the portable handheld work apparatus. During operation of the cleaning arrangement, increasing flow resistances of the air filter develop in dependence upon the layer thickness of the dust deposited on the air filter. The operation of the engine can be thereby affected. The cleaning arrangement requires correspondingly high maintenance.

SUMMARY OF THE INVENTION

It is an object of the invention to provide a cleaning arrangement for the combustion air of an internal combustion engine which ensures a disturbance-free operation of the engine over long services times.

The cleaning arrangement of the invention is for the combustion air of an internal combustion engine including an internal combustion engine of a portable handheld work apparatus. The engine includes a carburetor and the cleaning arrangement includes: a filter housing defining an interior; an air filter mounted in the filter housing for filtering the combustion air supplied to the engine; the air filter being mounted in the filter housing so as to partition the interior into a contaminant space and a clean space fluidly connected to the carburetor; a blower for moving a flow of the combustion air laden with dust to the filter housing; a centrifugal-force separator mounted in the contaminant space for receiving the flow of combustion air and for dividing the flow into a central core flow having a low particle density of the dust and a tangential flow surrounding the core flow with the tangential flow having a particle density of the dust greater than the low particle density; and, the centrifugal-force separator having conducting means for conducting the central core flow into the contaminant space.

According to the invention, the cleaning arrangement is provided with a centrifugal-force separator with which dust-laden combustion air is supplied under an overpressure by the blower to the centrifugal-force separator during operation. A central core flow having a low particle density and a tangential flow of larger particle density than in the core flow forms in the centrifugal-force separator. The tangential flow surrounds the core flow. After axial passage of the core flow through the centrifugal-force separator, the core flow exits into the contaminant space of the filter housing in which the centrifugal-force separator is integrated.

The filter housing has a partition plane which partitions the filter housing into first and second filter housing parts. It is advantageous to so mount the centrifugal-force separator in the filter housing that it is essentially partitioned in the partition plane of the filter housing. For maintenance and cleaning purposes, the centrifugal-force separator is also opened when the filter is opened in order to do maintenance work.

To simplify the manufacture of the filter housing and of the centrifugal-force separator, it is practical to form at least one part of the centrifugal-force separator as one piece with the filter housing. It can also be practical to configure the centrifugal-force separator as a separate component in one or several parts and to form-tightly connect the separator to the filter housing so that it can be separated. Preferably, the centrifugal-force separator has a partition plane which partitions the same in the longitudinal direction. The partition plane lies in the longitudinal axis of the centrifugal-force separator or is parallel to its axis.

The feed by the blower of the combustion air to be cleaned takes place preferably via a feed channel to the centrifugal-force separator. The feed channel is formed in the first filter housing part. The second filter housing part is connected seal tight to the first filter housing part during operation of the portable handheld work apparatus and this second part preferably accommodates the air filter and a part of the centrifugal-force separator. The core flow in the centrifugal-force separator is characterized by a low particle density and, during operation of the cleaning arrangement, the core flow is taken out via a dip tube arranged at a first axial end of the centrifugal-force separator. The core flow is conducted out of the centrifugal-force separator via the dip tube in an essentially axial direction. It is practical to completely fix the dip tube to the first filter housing part.

It is practical to expand the dip tube diffusor-like or with a funnel shape to the contaminant space of the filter housing in dependence upon the space available in the filter housing and the desired flow guidance of the core flow. Preferably, the feed channel opens tangentially into the centrifugal-force separator at a second axial end thereof lying opposite to the first axial end. The feed channel is guided upstream over a part length about the casing of the centrifugal-force separator. The feed channel preferably tapers toward its entry opening into the centrifugal-force separator.

It is practical to configure the centrifugal-force separator as a cyclone or axial cyclone. Other configurations of centrifugal-force separators, such as a turbofilter, can also be used.

A cooling air fan of the engine is preferably suitable as a blower for feeding uncleaned combustion air into the centrifugal-force separator. It can be practical to conduct away the tangential flow into the cooling air flow via the engine housing.

BRIEF DESCRIPTION OF THE DRAWINGS

The invention will now be described with reference to the drawings wherein:

FIG. 2 is a perspective view of a first filter housing part showing parts of a centrifugal-force separator;

FIG. 3 is a perspective view of a complementary part corresponding to the centrifugal-force separator of FIG. 2; and, FIG. 4 is a perspective view of the air filter cover for the cleaning arrangement of the invention.

DESCRIPTION OF THE PREFERRED EMBODIMENTS OF THE INVENTION

Figure 1:
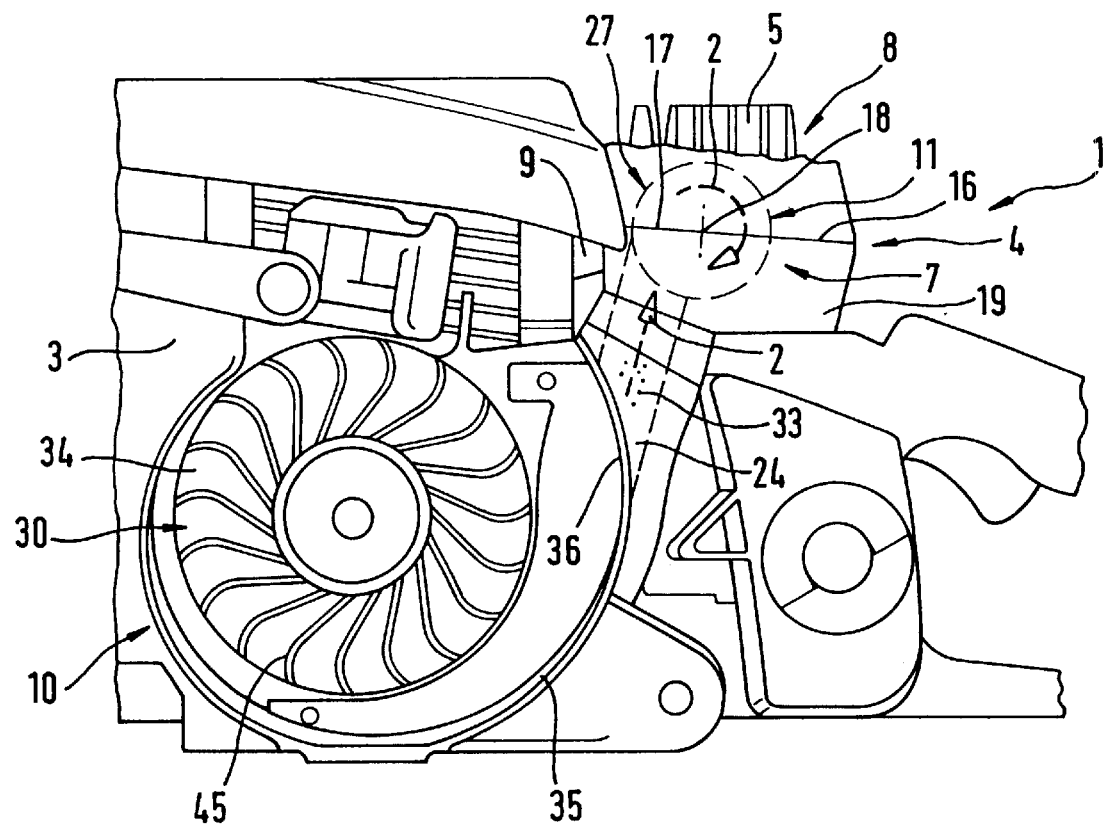
FIG. 1 is a partial view of a portable handheld work apparatus incorporating the cleaning arrangement according to the invention.

The perspective view of FIG. 1 shows a cleaning arrangement 1 for the combustion air 2 of an internal combustion engine 3 of a portable handheld work apparatus such as a motor-driven chain saw. Dirt particles of varying particle size are generated by the work tool of such work apparatus when working therewith especially when working with a cutoff machine. The dust can be formed of organic particles such as wood chips or the like or inorganic particles such as stone powder or metal chips.

The combustion air 2 which is fed to the engine 3 from the ambient air must be cleaned before entry into the engine 3. The cleaning arrangement 1 is mounted at the input of the intake section of the carburetor 9 for cleaning the combustion air. The cleaning arrangement comprises essentially a filter housing 4 in which an air filter 5 is mounted. The air filter 5 partitions the filter housing 4 into a contaminant space 7 and a clean space 8. The carburetor 9 is fluidly connected to the clean space 8 of the filter housing 4. A blower 10 is provided for feeding the combustion air 2 which contains entrained dust 33.

In the embodiment shown in FIG. 1, the blower 10 is a cooling air fan 30 of the engine 3. The cooling air fan 30 is configured as a radial blower and moves combustion air at an overpressure with the aid of the fan wheel 34 from the blower housing 35 into the feed channel 24 in the filter housing 4.

As shown in FIGS. 1 and 2, the filter housing 4 is partitioned in this embodiment at a partition plane 16 into a first filter housing part 19 and a second filter housing part 20. The feed channel 24 is guided in the first filter housing part wherein a part of the centrifugal-force separator 11 is also mounted. The first filter housing part 19 with the feed channel 24, which is mounted therein, joins seal tight to the blower housing 35, especially at its tangential discharge 36. In the embodiment shown, the first filter housing part 19 is configured as a single piece injection molded part and has a sealing element 37 in the partition plane 16. The sealing element 37 is formed in the manner of a flat seal. The sealing element 37 lies in a seal slot 38 along the peripheral edge 39 of the first filter housing part 19 and functions to seal the second filter housing part 20 (see FIG. 3) to the first filter housing part 19. The seal slot 38 has a U-shaped cross section. The second filter housing part 20 is configured as an air filter cover 29 and is part of the outer engine housing (see FIG. 4).

As shown in FIG. 2, the cylindrical centrifugal-force separator 11 is longitudinally partitioned approximately in the partition plane 16 of the filter housing 4. A first housing part 40 of the centrifugal-force separator 11 is incorporated form-tight into the filter housing part 19. In the embodiment shown in FIG. 2, the centrifugal-force separator 11 is configured as a cyclone 27, especially an axial cyclone 28 having an approximately cylindrically-shaped configuration. The first housing part 40 of the centrifugal-force separator 11, preferably the entire separator 11, can be configured as one piece with the filter housing 4, for example, as an injection molded part. It can be advantageous to configure the centrifugal-force separator 11 as a separate component and to connect this component to the filter housing 4. This connection can be form-tight, force-tight or even partially material-tight. The centrifugal-force separator 11, which is shown in FIGS. 2 and 3, is longitudinally partitioned in a partition plane 17 which is approximately coincident with the partition plane 16 of the filter housing 4. For this reason, the cleaning of the centrifugal-force separator can be done easily without difficulty. The partition plane 17 preferably lies in the longitudinal axis 18 of the centrifugal-force separator or runs parallel to the longitudinal axis 18. The second housing part 41 of the centrifugal-force separator 11 is shown in FIG. 3 and is surrounded in the embodiment shown by the second filter housing part 20. The second filter housing part 20 additionally surrounds the air filter 5. The second filter housing part 20 is joined to an intake section (not shown) of the carburetor 9 at the clean space 8.

A dip tube 21 is mounted coaxially to the longitudinal axis 18 of the axial cyclone 28 at a first axial end 22 of the centrifugal-force separator 11. The dip tube 21 is configured with a cylindrical section 47 in the interior of the axial cyclone 28. This section expands funnel-like toward the axial end 22. The diameter of the cylindrical section 47 is approximately half the size of the diameter of the housing of the axial cyclone 28 and expands up to the diameter of the housing of the axial cyclone 28 because of the funnel-shaped part 42. The funnel-shaped part 42 of the dip tube 21 functions with its peripheral edge 43 as a spatial termination for the axial cyclone 28. The peripheral edge 43 lies facing toward the axial end 22 and the spatial termination lies in the contaminant space.

The feed channel 24 opens tangentially into the centrifugal-force separator 11 at the second axial end 23 thereof which lies opposite the first end 22. In the embodiment shown in FIGS. 2 and 3, the feed channel 24 with its component length 25 is arcuately guided about the housing casing 26 of the centrifugal-force separator 11. The arcuately-shaped component length 25 of the feed channel 24 tapers toward the entry opening 44 into the centrifugal-force separator 11 (see FIG. 2).

During operation of the cleaning arrangement 1, the cooling air fan 30 with its fan vanes 45 moves the combustion air 2 with dust components 33 in radial and tangential direction through the discharge 36 on the blower housing 35 into the feed channel 24 in the first filter housing part 19. The feed channel 24 opens tangentially into the centrifugal-force separator 11 and causes the combustion air 2 to be deflected into a rotating tangential flow 14 (see FIGS. 1 and 2). The combustion air 2 enters into the centrifugal-force separator with an overpressure. The tangential flow 14 has a high particle density 15 and moves rotatingly and translatory from the second axial end 23 to the first axial end 22 in the centrifugal-force separator 11. Significant portions of the entire dust load, which enters into the centrifugal-force separator 11, are transported in the tangential flow because of centrifugal forces.

As shown in FIG. 2, the tangential flow 14 completely surrounds the core flow 12 in the center of the tangential flow. The core flow 12 moves essentially translatory in the separator 11 from the axial end 22 to the axial end 23 coaxially along the longitudinal axis 18 of the separator 11. The core flow 12 has a significantly lesser particle density 13 than the tangential flow 14 and includes at most particles of low mass. The tangential flow 14 and core flow 12 are directed away from the separator 11 separately. The dip tube 21 functions to direct away the core flow 12 and this tube 21 together with the filter housing 4 ensures that the core flow 12 is conducted to the part of the air filter 5 on the contaminant space side.

The tangential flow 14 with major portions of dust 33 is conducted away via a discharge stub 46 from the centrifugal-force separator 11. In the embodiment shown, the discharge stub 46 is cylindrically-shaped and formed as one piece with the second housing part 41 of the separator 11 (see FIG. 3). The outer diameter of the discharge stub 46 is approximately three times smaller than the diameter of the housing of the centrifugal-force separator 11. The inner diameter of the discharge stub is, in turn, approximately a third of the outer diameter.

The discharge stub 46 is mounted in the proximity of the axial end 23 viewed in the axial direction of the separator 11 and is in an axial section of the separator 11 wherein the cylindrical part of the dip tube 21 is located. In the embodiment shown, the tangential flow 14 is conducted away into the interior 31 of the engine housing (see FIG. 4). It can be practical to conduct the tangential flow 14 from the engine housing into the ambient of the portable handheld work apparatus 4 or to discharge the air via the cooling air fan of the engine.

It is understood that the foregoing description is that of the preferred embodiments of the invention and that various changes and modifications may be made thereto without departing from the spirit and scope of the invention as defined in the appended claims.

What is claimed is:

1. A cleaning arrangement for the combustion air of an internal combustion engine including an internal combustion engine of a portable handheld work apparatus, the engine including a carburetor and the cleaning arrangement comprising:

a filter housing defining an interior;

an air filter mounted in said filter housing for filtering the combustion air supplied to said engine;

said air filter being mounted in said filter housing so as to partition said interior into a contaminant space and a clean space fluidly connected to said carburetor;

a blower for moving a flow of the combustion air laden with dust to said filter housing;

a centrifugal-force separator mounted in said contaminant space for receiving said flow of combustion air and for dividing said flow into a central core flow having a low particle density of said dust and a tangential flow surrounding said core flow with said tangential flow having a particle density of said dust greater than said low particle density; and, said centrifugal-force separator having conducting means for conducting said central core flow into said contaminant space;

said filter housing defining a first partition plane partitioning said filter housing into first and second filter housing parts; and, said centrifugal-force separator being partitioned and defining a second partition plane corresponding essentially to said first partition plane so as to permit said centrifugal-force separator to be opened when said filter housing is opened.

2. The cleaning arrangement of claim 1, wherein said centrifugal-force separator defines a longitudinal axis; and, said second partition plane lies in said longitudinal axis or lies approximately parallel to said longitudinal axis.

3. The cleaning arrangement of claim 2, wherein said centrifugal-force separator is formed as one piece in component regions with said filter housing.

4. The cleaning arrangement of claim 2, wherein said centrifugal-force separator is form-tightly connected to said filter housing so as to be separable therefrom.

5. The cleaning arrangement of claim 1, wherein a feed channel for said combustion air is guided through said first filter housing part to said centrifugal-force separator; and, said second housing part accommodates said air filter and part of said centrifugal-force separator.

6. The cleaning arrangement of claim 1, wherein said conducting means comprises a dip tube mounted at a first axial end of said centrifugal-force separator for conducting said central core flow into said contaminant space of said filter housing; and, said dip tube expands funnel-like into said contaminant space.

7. The cleaning arrangement of claim 6, wherein said dip tube is fixed to said first filter housing part.

8. The cleaning arrangement of claim 6, wherein said feed channel opens tangentially into said centrifugal-force separator at a second axial end thereof.

9. The cleaning arrangement of claim 8, wherein said feed channel is guided over a portion of its length about the housing of said centrifugal-force separator with said length of said feed channel having a tapering cross section.

10. The cleaning arrangement of claim 1, wherein said centrifugal-force separator is a cyclone.

11. The cleaning arrangement of claim 1, wherein said centrifugal-force separator is an axial cyclone.

12. The cleaning arrangement of claim 1, wherein said blower is a cooling fan of said internal combustion engine.

13. The cleaning arrangement of claim 6, wherein said tangential flow is discharged from said centrifugal-force separator in the region of said dip tube.

14. The cleaning arrangement of claim 13, wherein said tangential flow is discharged into a cooling airflow.

* * * * *